US012640531B2

(12) United States Patent
Catanese et al.

(10) Patent No.: US 12,640,531 B2
(45) Date of Patent: May 26, 2026

(54) MULTI BAND, CONTINUOUSLY TUNABLE, ULTRASHORT PULSE FIBER LASER

(71) Applicant: BAE SYSTEMS Information and Electronic Systems Integration Inc., Nashua, NH (US)

(72) Inventors: Anthony J. Catanese, Nashua, NH (US); Kevin T Werner, Merrimack, NH (US); Michael L Lemons, Antrim, NH (US); Ezra S Allee, Windham, NH (US); Yannick C. Morel, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 607 days.

(21) Appl. No.: 18/193,864

(22) Filed: Mar. 31, 2023

(65) Prior Publication Data
US 2024/0332883 A1 Oct. 3, 2024

(51) Int. Cl.
*H01S 3/00* (2006.01)
*G02F 1/35* (2006.01)
(Continued)

(52) U.S. Cl.
CPC .......... *H01S 3/0057* (2013.01); *G02F 1/3513* (2013.01); *G02F 1/365* (2013.01);
(Continued)

(58) Field of Classification Search
CPC .. H01S 3/0057; H01S 3/06754; H01S 3/0092; H01S 3/06716; H01S 3/094011;
(Continued)

(56) References Cited

U.S. PATENT DOCUMENTS 8,570,646 B2 10/2013 Fermann
8,861,555 B2 10/2014 Fermann et al.
(Continued)

FOREIGN PATENT DOCUMENTS

WO 2002084821 A2 10/2002
WO 2022164781 A1 8/2022

OTHER PUBLICATIONS

"Ultrashort Pulse", retrieved from "https://en.wikipedia.org/w/index.php?title=Ultrashort_pulse&oldid=1073537142"; Feb. 23, 2022.

*Primary Examiner* — Daniel St Cyr
(74) *Attorney, Agent, or Firm* — Gary McFaline

(57) ABSTRACT

Ultrashort pulsed laser systems are described. In one example, a pulsed laser system includes a source laser configured to emit a pulsed source laser beam, a splitter configured to split the source laser beam into first and second input laser beams, a first amplifier module configured to amplify the first input laser beam using chirped pulse amplification (CPA) and to produce, at a first output port, a first output laser beam in a first spectral range based on soliton self-frequency shift (SSFS) in the first amplifier module, a second amplifier module configured to amplify the second input laser beam using CPA and to produce an intermediate beam based on SSFS in the second amplifier module, and a mid-infrared fiber configured to receive the intermediate beam and to produce, at a second output port, a second output laser beam in a second spectral range based SSFS in the mid-infrared fiber.

20 Claims, 10 Drawing Sheets

(51) Int. Cl.

| | |
|---|---|
| *G02F 1/365* | (2006.01) |
| *H01S 3/067* | (2006.01) |
| *H01S 3/094* | (2006.01) |
| *H01S 3/0941* | (2006.01) |
| *H01S 3/13* | (2006.01) |
| *H01S 3/16* | (2006.01) |

(52) U.S. Cl.
CPC ........ *H01S 3/0092* (2013.01); *H01S 3/06716* (2013.01); *H01S 3/094011* (2013.01); *H01S 3/094061* (2013.01); *H01S 3/0941* (2013.01); *H01S 3/13013* (2019.08); *H01S 3/1616* (2013.01); *G02F 2203/11* (2013.01); *H01S 2301/085* (2013.01); *H01S 2302/00* (2013.01)

(58) Field of Classification Search
CPC ............. H01S 3/094061; H01S 3/0941; H01S 3/1616; H01S 3/13013; G02F 1/3513; G02F 1/365
USPC .................................................... 359/341.33
See application file for complete search history.

(56) References Cited

U.S. PATENT DOCUMENTS

| | | | |
|---|---|---|---|
| 9,209,592 B2 | 12/2015 | Meshev et al. | |
| 9,529,182 B2* | 12/2016 | Chuang ................. | H01S 3/0092 |
| 9,570,873 B2 | 2/2017 | Shaw et al. | |
| 9,601,899 B2 | 3/2017 | Salem et al. | |
| 9,825,419 B2 | 11/2017 | Hori et al. | |
| 11,201,448 B1 | 12/2021 | Morel et al. | |
| 11,349,276 B1 | 5/2022 | Budni et al. | |
| 2014/0219296 A1* | 8/2014 | Fermann ............ | G02B 6/02038 |
| | | | 372/18 |
| 2015/0159990 A1* | 6/2015 | Plusquellic .......... | G01N 21/255 |
| | | | 359/279 |
| 2015/0192768 A1* | 7/2015 | Salem ..................... | H01S 3/302 |
| | | | 250/227.2 |
| 2016/0240994 A1* | 8/2016 | Zach ..................... | H01S 5/4087 |
| 2019/0173256 A1 | 6/2019 | Fevrier et al. | |
| 2020/0127430 A1* | 4/2020 | Yusim ................. | H01S 3/08009 |

* cited by examiner

106 ⎯⎯⎯⎯→

108 ⎯⎯⎯⎯→

700

702 ⎯⎯→

MULTI BAND, CONTINUOUSLY TUNABLE, ULTRASHORT PULSE FIBER LASER

FIELD OF DISCLOSURE

The present disclosure relates to fiber-based laser systems, and more particularly to infrared fiber-based ultrashort pulsed lasers.

BACKGROUND

Ultrashort pulsed laser (USPL) technology, sometimes referred to as ultrafast, refers to laser pulses having a time duration on the order of picoseconds (ps) or shorter (faster). Unfortunately, there are few USPL architectures available for the short-wave infrared (SWIR) and/or mid-wave infrared (MWIR) regions of the spectrum. Existing implementations are based on near-infrared (NIR) lasers which emit in the range from 700 to 1100 nanometers (nm). These lasers are then converted in frequency to the MWIR spectrum using nonlinear optical processes. However, there are several limitations and disadvantages associated with these approaches, including low efficiency in the nonlinear optical mixing processes that results in difficulties associated with producing high power systems, limited spectral coverage, and size weight and power requirements of these systems. In addition, there are limited available options for multi-band lasers which simultaneously emit two separate colors that are synchronized in time. Thus, a number of non-trivial challenges exist with respect to extending USPLs into the mid-infrared spectrum, while also making these systems compact.

SUMMARY

Aspects and embodiments are directed to techniques for providing a continuously tunable, multi-band emitting, infrared ultrashort pulsed fiber laser system.

According to one embodiment, this ultrashort pulsed laser system comprises a first output port, a second output port, a source laser configured to emit a source laser beam comprising a series of ultrashort pulses, and a splitter optically coupled to the source laser and configured to split the source laser beam into first and second optical paths to provide first and second input laser beams. The system further comprises a first amplifier module configured to amplify the first input laser beam using chirped pulse amplification and to produce a first output laser beam in a first spectral range at the first output port based on soliton self-frequency shift in the first amplifier module, a second amplifier module configured to amplify the second input laser beam using chirped pulse amplification and produce an intermediate beam based on soliton self-frequency shift in the second amplifier module, and a mid-infrared fiber coupled between the second amplifier and the second output port, wherein the mid-infrared fiber is configured to receive the intermediate beam and to produce a second output laser beam in a second spectral range at the second output port based on soliton self-frequency shift in the mid-infrared fiber.

Examples of the system may include any one or more of the following features.

In examples, the mid-infrared fiber can be any type of glass fiber that is transparent in the mid-infrared and has anomalous chromatic dispersion within the mid-infrared spectral range, such as, a fluoride fiber, a chalcogenide glass fiber, a germinate glass fiber, a polycrystalline fiber, or a sapphire fiber, among others.

In one example, the first amplifier module comprises a first thulium-doped fiber amplifier, wherein a wavelength of the first output laser beam is continuously tunable within the first spectral range based on controlling a pump current supplied to the first thulium-doped fiber amplifier. In another example, the second amplifier module comprises a second thulium-doped fiber amplifier, wherein a wavelength of the intermediate beam is continuously tunable within the first spectral range based on controlling a pump current supplied to the second thulium-doped fiber amplifier. In one example, the first spectral range includes a wavelength range from 2 micrometers to 2.3 micrometers. In another example, the second spectral range includes a wavelength range from 2 micrometers to 3.9 micrometers.

The first amplifier module may further comprise a first pulse stretcher coupled between the splitter and the first thulium-doped fiber amplifier, and a first pulse compressor coupled between the first thulium-doped fiber amplifier and the first output port. In one example, the second amplifier module further comprises a second pulse stretcher coupled between the splitter and the second thulium-doped fiber amplifier, and a second pulse compressor coupled between the second thulium-doped fiber amplifier and the mid-infrared fiber. In one examples, each of the first and second pulse stretchers comprises a polarization-maintaining, normally dispersive optical fiber, wherein each of the first and second pulse compressors comprises a large mode-area, polarization-maintaining, anomalous dispersion optical fiber.

In one example, each of the first and second thulium-doped fiber amplifiers comprises a fused silica optical fiber, and wherein the wavelengths of the first output laser beam and the intermediate beam are produced by soliton self-frequency shift in the fused silica fibers.

In one example, the pulsed laser system further comprises a nonlinear crystal configured to receive and mix the first and second output laser beams to produce a third output laser beam having a wavelength in a third spectral range. The first spectral range may include at least a portion of the short-wave infrared spectrum, the second spectral range may include at least a portion of the mid-wave infrared spectrum, and the third spectral range may include at least a portion of the long-wave infrared spectrum.

According to another embodiment, an ultrashort pulsed laser system comprises a source laser configured to emit a source laser pulse having a source central wavelength, a splitter optically coupled to the source laser via at least one passive polarization-maintaining optical fiber and configured to split the source laser pulse into first and second optical paths, a first thulium-doped fiber amplifier (TDFA) positioned in the first optical path and configured to amplify the source laser pulse, the first TDFA being pumped with a first pump current sufficient to produce soliton fission in the first TDFA to generate a first output laser pulse having a first central wavelength that is red-shifted relative to the source central wavelength based on soliton self-frequency shift, the first central wavelength being in a first spectral range, a second TDFA positioned in the second optical path and configured to amplify the source laser pulse, the second TDFA being pumped with a second pump current sufficient to produce soliton fission in the second TDFA to generate an intermediate laser pulse having a central wavelength that is in the first spectral range and red-shifted relative to the source central wavelength based on soliton self-frequency shift, and a mid-infrared fiber coupled to the second TDFA and configured to red-shift the central wavelength of the intermediate laser pulse to produce a second output laser pulse having a second central wavelength in a second spectral range.

In one example, each of the first and second TDFAs includes a fused silica fiber, and wherein the soliton self-frequency shift occurs in the fused silica fiber. In one example, the mid-infrared fiber causes the red-shift of the central wavelength of the intermediate laser pulse based on soliton self-frequency shift in the mid-infrared fiber. The mid-infrared fiber can be any type of glass fiber that is transparent in the mid-infrared and has anomalous chromatic dispersion within the mid-infrared spectral range, such as, a fluoride fiber, a chalcogenide glass fiber, a germinate glass fiber, a polycrystalline fiber, or a sapphire fiber, for example.

In one example, the first spectral range includes at least a portion of the short-wave infrared spectrum, and wherein the second spectral range includes at least a portion of the mid-wave infrared spectrum.

In one example, the ultrashort pulsed laser system further comprises a nonlinear crystal configured to receive and mix the first and second output laser pulses to produce a third output laser pulse having a third central wavelength in a third spectral range spanning at least a portion of the long-wave infrared spectrum.

In one example, the source central wavelength is in a range of 1.5 $\mu$m to 2 $\mu$m, for example, 1.98 $\mu$m.

An example of the ultrashort pulsed laser system may further comprise first and second pulse stretchers positioned in the first and second optical paths, respectively, and configured to temporally stretch the source laser pulse prior to amplification of the source laser pulse by the first and second TDFAs, respectively, and first and second pulse compressors positioned in the first and second optical paths, respectively, and configured to temporally compress the first output laser pulse and the intermediate laser pulse, respectively. In one example, the first and second pulse stretchers individually include a polarization-maintaining, normally dispersive optical fiber, and the first and second pulse compressors individually include a large mode-area, polarization-maintaining, anomalous dispersion optical fiber.

According to another embodiment, a dual-band ultrashort pulsed laser system comprises a source laser configured to emit a source laser beam comprising a series of ultrashort pulses having a source wavelength, a 50/50 splitter configured to split the source laser beam into first and second channels, a first module in the first channel and configured to produce, from the source laser beam and using soliton self-frequency shift in a first gain fiber, a first pulsed output laser beam comprising a series of ultrashort pulses having a first output wavelength that is continuously tunable within a first spectral range, the first spectral range being red-shifted relative to the source wavelength and including at least a portion of the short-wave infrared spectrum, and a second module in the second channel and configured to produce, from the source laser beam and using soliton self-frequency shift in a second gain fiber and in a mid-infrared fiber coupled to the second gain fiber, a second pulsed output laser beam comprising a series of ultrashort pulses having a second output wavelength that is continuously tunable within a second spectral range, the second spectral range being red-shifted relative to the source wavelength and including at least a portion of the mid-wave infrared spectrum.

Still other aspects, embodiments, and advantages of these example aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

Figure 1:
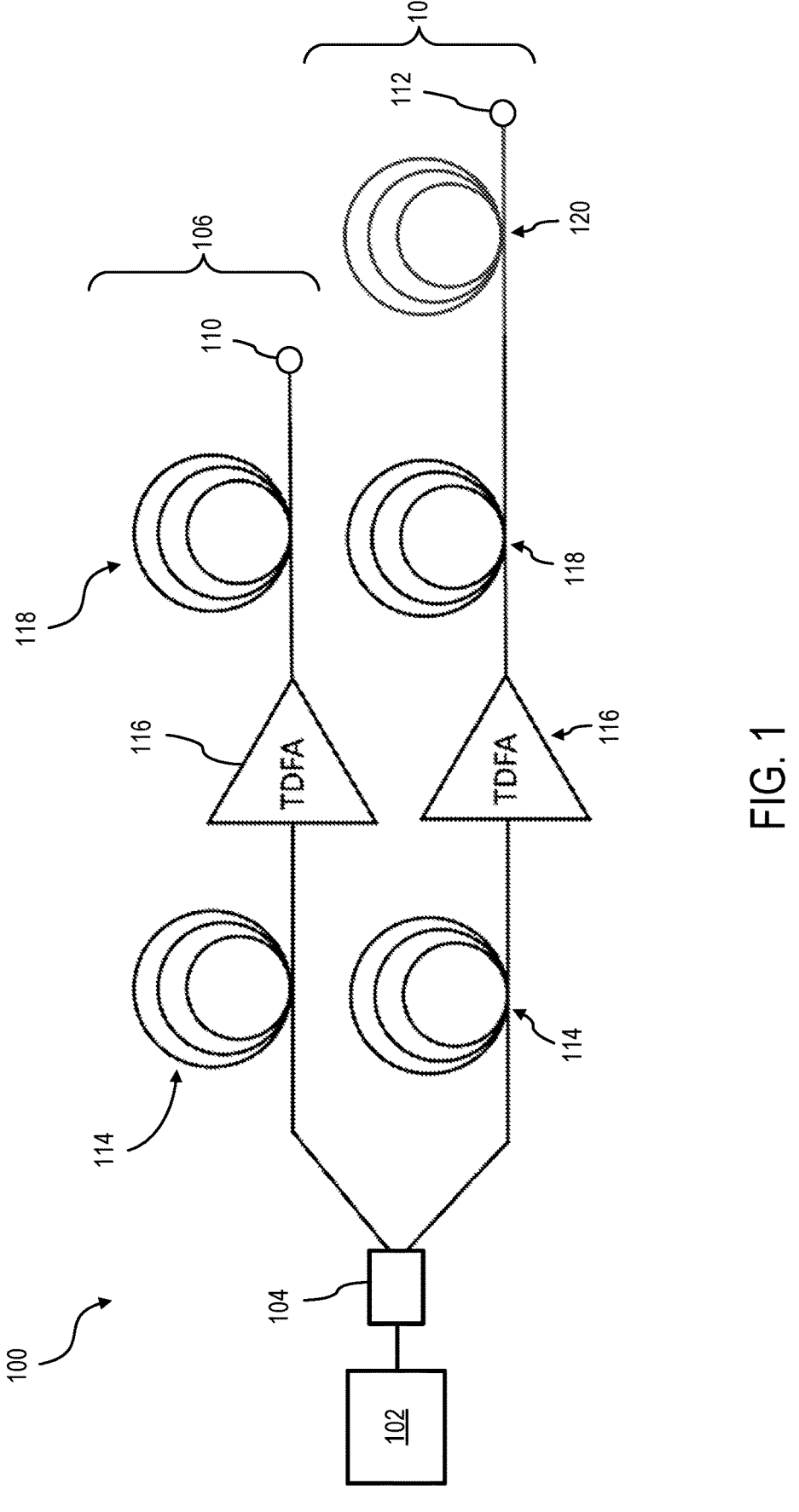
FIG. 1 is a diagram illustrating an example of a dual-band ultrashort pulsed laser system according to aspects of the present disclosure.

Although the following detailed description will proceed with reference being made to illustrative embodiments, many alternatives, modifications, and variations thereof will be apparent in light of this disclosure.

DETAILED DESCRIPTION

Techniques disclosed herein provide an architecture for an all-fiber, continuously tunable ultrashort pulsed laser (USPL), with dual-band emission in the spectral range from 2 to 4 micrometers ($\mu$m). In some examples, a first output band (band 1) is tunable from 2 to 2.3 $\mu$m and a second output band (band 2) is tunable from 2 to 4 $\mu$m. Mixing band 1 and band 2 in a nonlinear crystal enables the extension of the emission range from 4.1 $\mu$m to 12 $\mu$m. Certain implementations use a common source (e.g., oscillator emitting at 1.98 $\mu$m, in some examples) to produce the outputs in the two spectral bands. The first output band is generated via soliton self-frequency shift in a nonlinear fiber amplifier, and is tunable from 1.5 μm or 2 μm to 2.3 μm in some examples. The second output band, tunable from 1.5 μm or 2 μm to 3.9 or 4 μm in some examples, is generated via soliton self-frequency shift in a mid-infrared fiber (such as a fluoride fiber, for example), as described further below. Because both output bands are seeded from a common oscillator and are therefore synchronized, further mixing in a $\chi^2$ nonlinear crystal can be used to allow for difference frequency generation (DFG) of light spanning the spectrum from 4.1 to 12 μm. In some examples, laser characteristics include watt-level power and megahertz (MHz) pulse repetition rate with a pulse duration in the femtosecond (fs) range (e.g., ~100 fs). Thus, examples of system architecture described herein provide a path not only to the mid-wave spectrum but also the long-wave spectrum with millijoule (mJ) energy levels from a single common laser source. Furthermore, according to certain embodiments, high pulse repetition rate (e.g., ~50 MHz) and watt-level average power levels make the design suitable for seeding optically pumped (e.g., at 2 μm in some examples) USPL systems based on optical parametric chirped-pulse amplification (OPCPA).

GENERAL OVERVIEW

As noted above, there are non-trivial problems associated with developing infrared USPLs. For example, energy scaling USPLs within a specific spectral range begins with the design and development of a seed laser providing low energy levels at the desired spectral range. Although some systems use Ti:Sapphire lasers emitting at a central wavelength of about 780 nm, this wavelength is not conducive to long-range applications. There is a need for USPLs operating in the atmospheric transmission windows, namely, the SWIR (e.g., approximately 2-2.5 μm wavelengths), MWIR (e.g., approximately 3-5 μm wavelengths), and long-wave infrared (LWIR; e.g., approximately 8-12 μm wavelengths) spectral bands. Generally, for an application that calls for short-wave, mid-wave, and long-wave infrared wavelengths, completely separate and different seed lasers must be used. This adds complexity and cost for applications in which it is desirable to span more than one spectral range. In addition, one possible approach to producing a USPL with emission at a certain wavelength may employ optical parametric amplification in which two laser wavelengths are mixed together to produce a laser beam at a third wavelength. However, to implement such a process, two pulsed laser beams must spatially and temporally overlap with one another, and with great precision, which is difficult, particularly if two independent seed lasers are used. This problem is further exacerbated when using ultrashort pulsed laser beams. Another possible approach is to use supercontinuum lasers, which offer broad spectral outputs where the laser emission is spread over a wide spectral range, thus dispersing energy over the full spectral content. As a result, supercontinuum lasers are limited in power/energy at specific wavelengths of interest. Thus, there is a need for a tunable ultrashort pulsed laser that can be used as the seed for an infrared USPL system encompassing various spectral ranges.

Accordingly, aspects and embodiments are directed to techniques that address this need and provide an efficient, stable, and high repetition rate USPL that can be used as a common seed source for the development of high energy USPL systems in the SWIR, MWIR, and LWIR ranges of the spectrum via nonlinear conversion or direct optically pumped amplification. Certain examples provide an architecture for an all-fiber, ultrashort pulsed laser having multiple tunable outputs that can be combined to provide signals for various spectral ranges from the same underlying implementation. In some examples, the techniques described herein provide a tunable wavelength output with smaller bandwidth than supercontinuum lasers and concentrates the energy at specific wavelengths of interest. Increased pulse energy from the seed source within the desired bandwidth enables more efficient energy scaling of mid-infrared USPLs. As described in more detail below, certain examples provide a dual-band USPL that is continuously tunable in wavelength over a spectral range of approximately 2-4 μm (e.g., short-wave and mid-wave infrared ranges) based on soliton self-frequency shift in fused silica and fluoride fibers. In addition, the outputs in the two bands can be further combined in a nonlinear optical crystal to generate long-wave infrared wavelengths (e.g., over a spectral range of approximately 4-12 μm) through optical parametric amplification.

According to one embodiment, an ultrashort pulsed, dual-band emitting, laser system comprises first and second output ports, a source laser configured to emit a source laser beam comprising a series of ultrashort pulses, and a splitter optically coupled to the source laser and configured to split the source laser beam into first and second optical paths to provide first and second input laser beams. The system may further comprise a first amplifier module configured to amplify the first input laser beam using chirped pulse amplification and to produce a first output laser beam in a first spectral range at the first output port based on soliton self-frequency shift in the first amplifier module, a second amplifier module configured to amplify the second input laser beam using chirped pulse amplification and produce an intermediate beam based on soliton self-frequency shift in the second amplifier module, and a mid-infrared fiber coupled between the second amplifier and the second output port, wherein the mid-infrared fiber is configured to receive the intermediate beam and to produce a second output laser beam in a second spectral range at the second output port based on soliton self-frequency shift in the mid-infrared fiber.

In certain examples, the first and second amplifier modules are based on thulium-doped fiber amplifiers, and the soliton self-frequency shift can be controlled by controlling pump currents supplied to the amplifiers as described further below. Thus, the first and second output laser beams can have wavelengths that are continuously tunable over their respective spectral ranges. The mid-infrared fiber can be any type of glass fiber that is transparent in the mid-infrared and has anomalous chromatic dispersion within the mid-infrared spectral range. Examples include, but are not limited to, chalcogenide glass fibers, germinate glass fibers, polycrystalline fibers, fluoride fibers, or sapphire fibers.

Example System Architecture

FIG. 1 is a block diagram of an example dual-band ultrashort pulsed fiber laser system 100, in accordance with aspects of the present disclosure. The system 100 includes an oscillator and pre-amplifier 102, referred to herein as source or seed laser 102, and a splitter 104. The splitter 104 splits the output laser beam from the source 102 into two optical paths, referred to herein as first and second channels 106, 108, such that the system 100 provides two output beams individually at first and second output ports 110 and 112, respectively. In one example, the splitter 104 is a 50/50 splitter, such that the starting power of the laser beams in each channel is the same, although other split-schemes may be used. According to certain examples, the source 102 is configured to emit ultrafast (e.g., on the order of ps or faster, such as 100 fs) pulses at a selected central wavelength, repetition rate, and pulse energy level. The central wavelength may be in a range of about 1.5 to 2 µm. In one example, the central wavelength is approximately 2 µm, for example, 1.98 µm, the pulse repetition rate is 50 MHz, and the maximum pulse energy is 10 nJ. The pulsed waveform emitted from the source 102 is split, with the 50/50 splitter 104, into the first and second channels 106, 108 and used to seed amplifiers 116 to produce the output beams in different spectral bands at the two output ports 110, 112, as described further below. By using the common source 102 to seed both amplifiers 116, the output beams at the first and second output ports 110, 112 are synchronized, such that they can be mixed using a nonlinear crystal, for example, to extend the emission range into the LWIR spectral band. Note that the oscillator and pre-amplifier of source 102 are depicted as a single module in this example, but in other examples they may be implemented separately to provide the desired common source 102.

According to certain examples, each channel 106, 108 includes a nonlinear chirped pulse amplification (CPA) module that includes a pulse stretcher 114, an amplifier 116, and a pulse compressor 118. The second channel 108 additionally includes a fluoride fiber 120 that receives the output of amplifier 116 (post-compression via pulse compressor 118). In some examples, the system 100 is configured to implement chirped pulse amplification to increase the energy in the laser beams. Using chirped pulse amplification, an ultrafast pulse emitted from the starting seed laser 102 is stretched in the time domain using the pulse stretchers 114, amplified using the amplifiers 116, and then compressed back to femtosecond time duration using the pulse compressors 118. The pulse stretchers 114 may be implemented using dispersion-compensating, polarization-maintaining optical fibers, as described further below. In one example, the pulses from the starting seed laser 102 are stretched in time to 10-15 ps duration. In certain examples, the amplifiers 116 are implemented as thulium-doped fiber amplifiers (TDFAs), constructed from large mode-area (LMA) polarization-maintaining optical gain fibers. Gain media such as Cr:ZnS and Cr:ZnSe can be used in the amplifiers 116 to allow for direct lasing in the 2 µm region with wide bandwidths due to relatively flat and broad emission spectra from these materials. In one example, the optical fibers used in the TDFAs 116 are fused silica fibers. In some examples, the amplifiers 116 are used to increase the pulse energy to 100-200 nJ. After amplification, the pulses are compressed in time using the pulse compressors 118, which may be implemented using LMA anomalous dispersion optical fibers. This process causes an increase in the peak optical power in the pulses. When the peak optical power crosses a certain threshold, soliton fission occurs. Further increasing the pump power to the amplifiers 116 causes soliton self-frequency shift of the spectrum towards longer wavelengths, as described further below. Accordingly, by controlling the pump power, the soliton self-frequency shift phenomenon can be used to tune the wavelengths of the output beams produced at the first and second output ports 106, 108.

Figure 2:
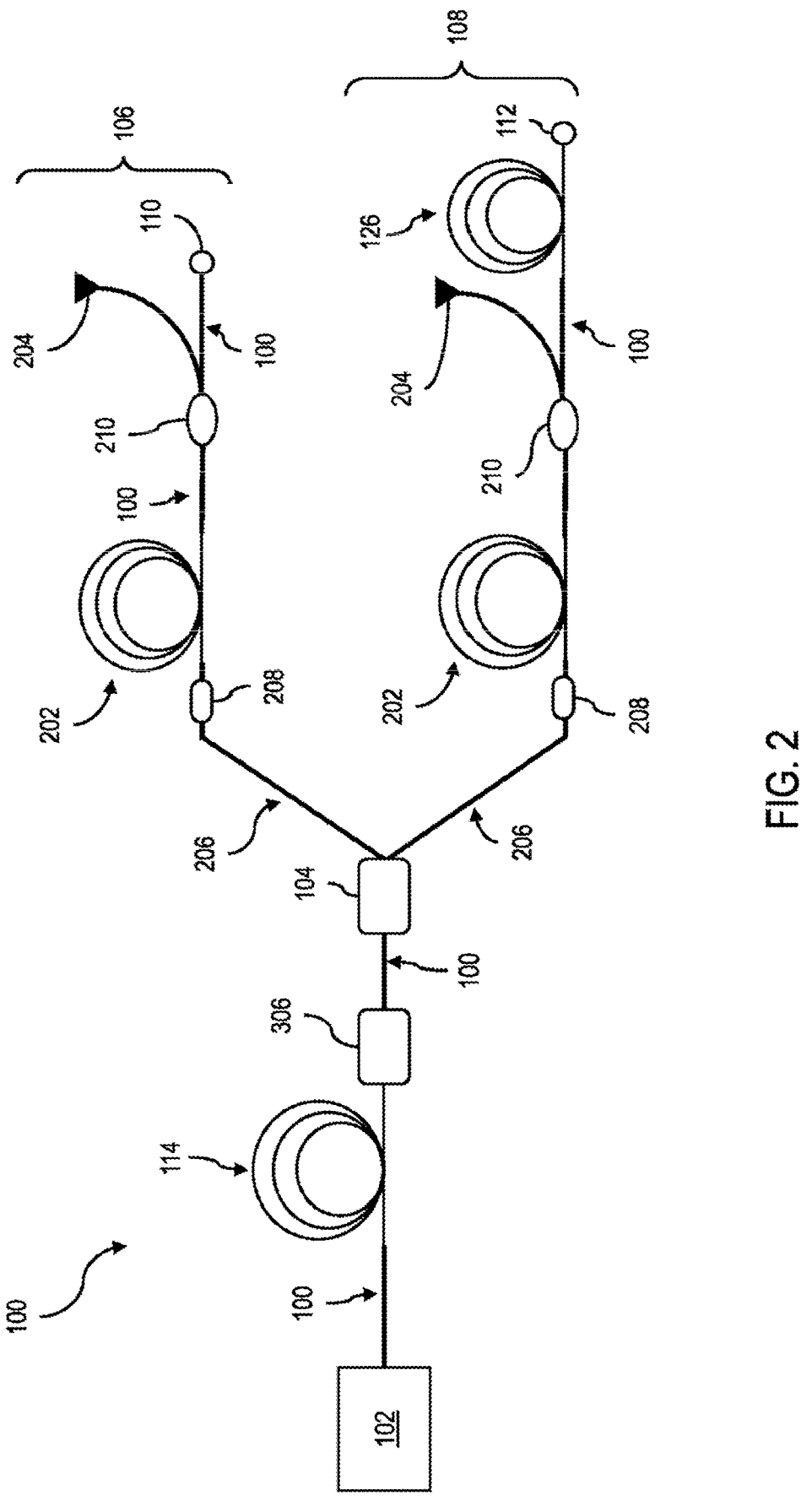
FIG. 2 is a diagram illustrating another example of the dual-band ultrashort pulsed laser system according to aspects of the present disclosure.

In the example shown in FIG. 1, the CPA module in each channel 106, 108 individually includes a pulse stretcher 114. FIG. 2 illustrates another example arrangement in which the pulse stretcher 114 is positioned before the splitter 104. Thus, in this configuration, a single pulse stretcher 114 is used for both channels 106, 108. Also, in FIG. 2, the amplifiers 116 and pulse compressors 118 in each channel 106, 108 are represented in combination by gain fibers 202.

Figure 3:
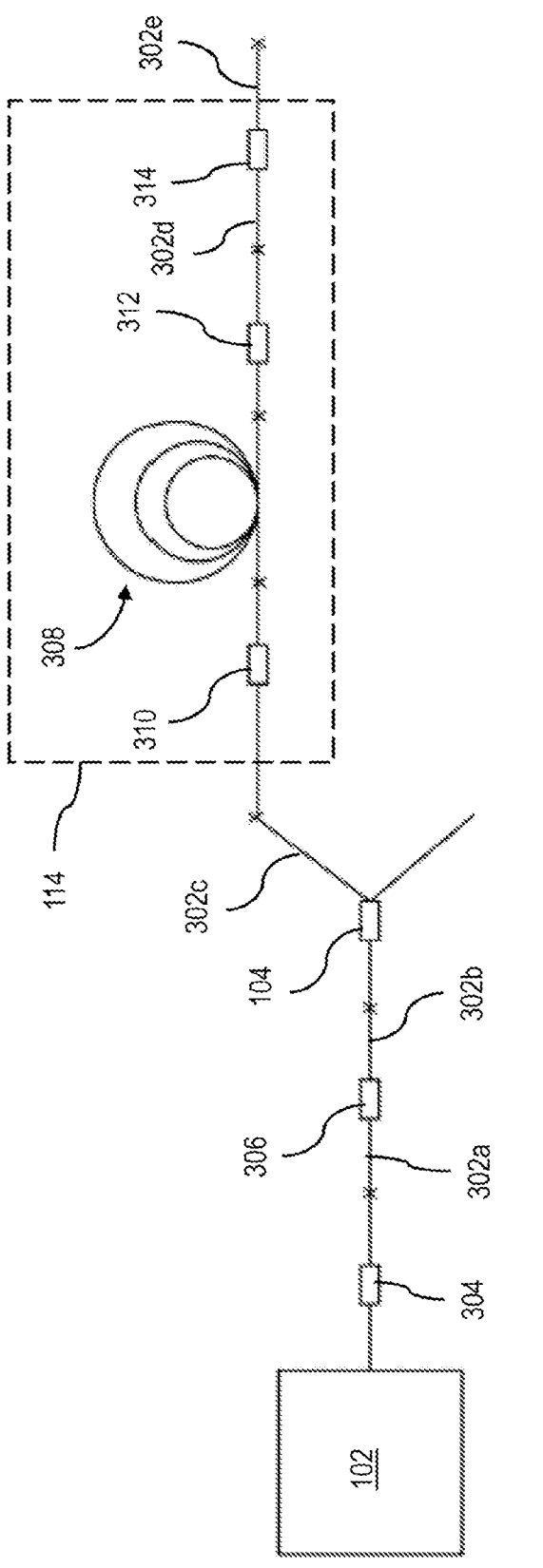
FIG. 3 is a diagram illustrating an example of an architecture for a pulse stretcher as may be used in the system of FIGS. 1 and 2, according to aspects of the present disclosure.

FIG. 3 is a block diagram illustrating a portion of one example of the system 100 including the source 102 and the pulse stretcher 114, according to certain aspects. The various system components are coupled together using lengths of passive, polarization-maintaining optical fiber 302, individually identified as fibers 302a-e. The number, lengths, and types of optical fibers 302 used in any given implementation may vary based on particular system parameters and design choices, as will be apparent and understood given the benefit of this disclosure. A connector 304 may be used to couple the source 102 to the first length of optical fiber 302a. In some examples, an isolator 306 is used to prevent any back-propagating light from reaching the source 102. As discussed above, the pulse stretcher 114 may be implemented using a polarization-maintaining, normally dispersive fiber 308. The length of the fiber 308 may be selected based on the desired amount of stretching. In one example, a 5.9 m length of the fiber 308 is used to stretch the ~100 fs pulse output from the source 102 to ~15 ps (full width half maximum). In the example architecture shown in FIG. 3, a first mode field adapter 310 is used to decrease the mode field diameter of the propagating light before it reaches the pulse stretching fiber 308. The mode field adapter 310 creates a match between otherwise mismatched fibers without loss (or with minimal loss). In one example, the pulse stretching fiber maybe implemented using a length of 4 µm mode field diameter fiber. Accordingly, for example, the first mode field adapter 310 may decrease the mode field diameter from 10 µm to 4 µm. In this example, two additional mode field adapters 312, 314 are used to increase the mode field diameter from 4 µm to 10 µm and then from 10 µm to 25 µm in preparation for the TDFA 116, which may be implemented using a 25 µm Large Mode Area (LMA) Thulium-Doped Gain Fiber (TDGF). However, it will be appreciated that in other examples, more or fewer mode field adapters 310, 312, 314 may be used to alter the mode field diameter by different amounts depending on the fibers used in any particular implementation. In other examples, one or more of the mode field adapters 301, 312, 314 may be omitted.

In some ultrafast fiber amplifiers, chirped pulse amplification is used to reduce the peak power of the pulse during amplification to avoid nonlinear effects such as Kerr self-phase modulation, for example. However, in examples of the system 100, by allowing the TDFAs 116 to run nonlinear, self-phase modulation coupled with the anomalous group velocity dispersion of the fused silica fibers can be used to generate temporal optical solitons. Temporal solitons are exact solutions to the wave equation for pulse propagation in optical fibers, known as the Generalized Nonlinear Schrodinger Equation (GNLSE) set forth as Equation (1) below.

$$\frac{\delta A}{\delta z} + \left( i \Sigma_{m=1}^{\infty} \frac{1}{m!} \beta_m \left( -i \frac{\delta}{\delta t} \right)^m \right) A + \frac{\alpha}{2} A + \frac{i g_0 G_\omega}{2} A = \tag{1}$$

$$i \gamma \left( 1 - \frac{i}{\omega_0} \frac{\delta}{\delta t} \right) \left( (1 - f_R) A |A|^2 + A \int_0^\infty f_R h_R(t') |A(t-t')|^2 dt' \right)$$

The wave equation set forth in Equation (1) describes the propagation of a pulse envelope A(z,t) in an optical fiber. It contains terms for chromatic dispersion, absorption, amplification, Kerr self-phase modulation, and the higher order nonlinear effects of self-steepening and Raman scattering. The soliton envelope, A(t) maintains a transform limited temporal shape as it propagates, A(t)∝sech (t/t$_0$), while simultaneously red-shifting to longer wavelengths. In certain examples, soliton self-frequency shift allows one to launch a ~2 μm ultrashort pulse into the fiber amplifiers 116 and shift the wavelength to the MWIR spectral band, as discussed further below. An example of this phenomenon is illustrated in FIG. 4.

Figure 4:
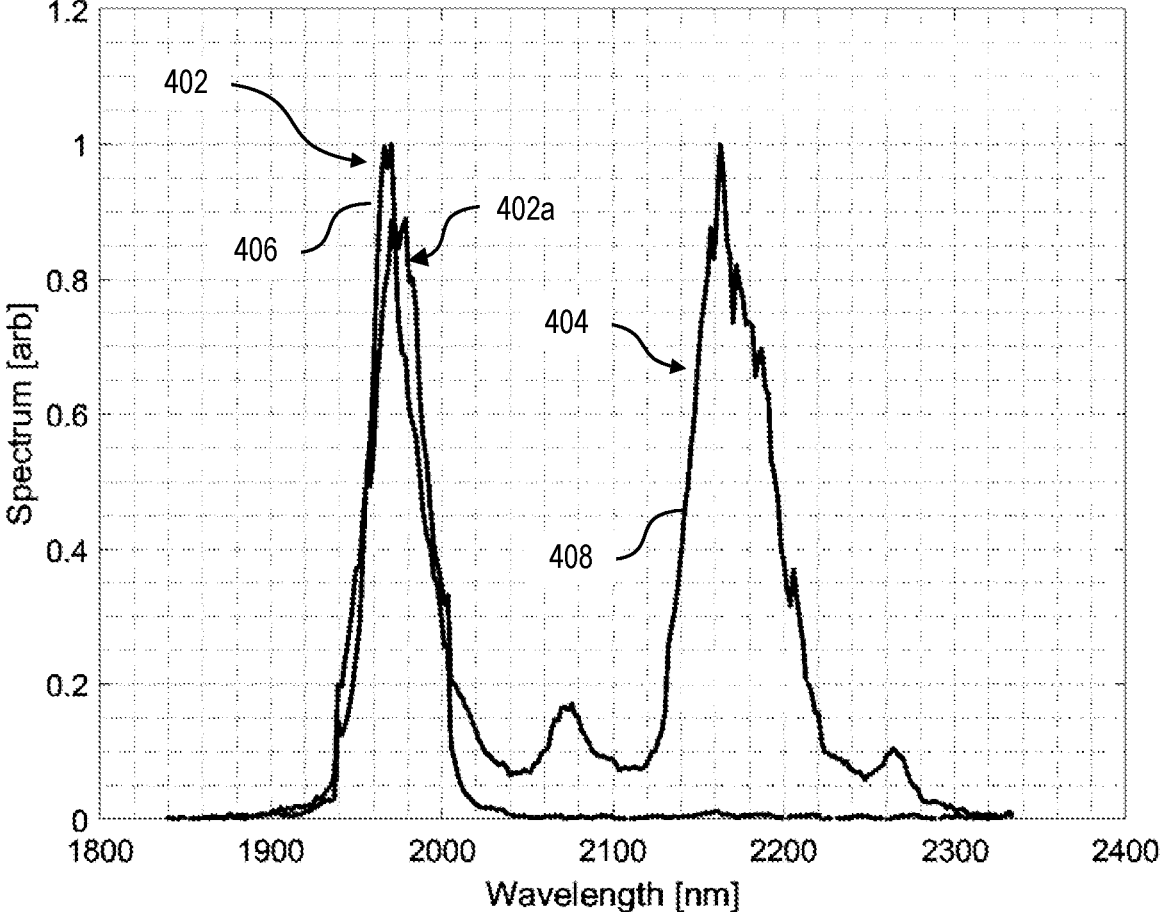
FIG. 4 is a graph illustrating an example of soliton self-frequency shift according to aspects of the present disclosure.

FIG. 4 is a graph showing an example of an optical soliton 404, which is red-shifted relative to the original pulse 402*a*. In FIG. 4, the horizontal axis represents the wavelength in nanometers (nm), and the vertical axis represents the power spectral density in arbitrary units at each wavelength. Trace 406 is the output spectrum from an example of a TDFA having relatively low power output power (1.4 Watts (W) in this example), and includes a pulse 402 centered around 1980 nm. Increasing the amplifier output power (to 6 W in this example) produces the output spectrum represented by trace 408. In this example, the amplifier power is sufficient to cause soliton fission and produce the soliton 404. As shown, the soliton central wavelength is red-shifted relative to the original pulse 402*a*, in this example, to about 2200 nm. The dynamics of the soliton shift depend on the launched pulse peak power and the length of the optical fiber. Thus, by configuring the gain fibers 202 (FIG. 2) and controlling the optical pump power, as discussed further below, the central wavelength of the soliton 404 can be tuned within a certain spectral range to a desired wavelength.

Referring again to FIGS. 1 and 2, the first channel 106 of the dual-band system 100 uses a soliton shift to produce the first output beam at the first output port 110. In one example, in which the source 102 produces the source laser beam centered at 1980 nm, the first channel 106 implements a soliton shift 1980 nm to 2090 nm in an LMA fused silica gain fiber 202. In this example, the emission wavelength of the first output beam at the first output port 110 is tunable between 1980 nm and 2090 nm depending on the power of the TDFA 116. This can be controlled rapidly and in real time by changing the current to the TDFA 116 pump diode 204.

As discussed above, in certain examples, the gain fibers 202 are LMA thulium-doped gain fibers to implement the TDFAs 116. However, in other examples, a different dopant can be used. For example, the amplifiers 116 can be implemented as erbium-doped fiber amplifiers, instead of thulium-doped fiber amplifiers. The length of the gain fiber 202 may vary depending on the particular application and/or system configuration. In one example, a 210 cm length of polarization maintaining LMA thulium-doped gain fiber is used. The gain fiber 202 may be coupled to a passive fiber 206 that connects the gain fiber 202 to the splitter 104 or pulse stretcher 114, optionally via one or more mode field adapters, as discussed above with reference to FIG. 3. In one example, the gain fiber is coupled to the passive fiber 206 using a high-index gel cladding light stripper 208 that is applied to the splice between the passive and active fibers 206, 202. As shown in FIG. 2, in some examples, the gain fiber 202 is backwards pumped with a pump diode 204. In one example, the pump diode 204 is configured to emit light at a wavelength of 793 nm with a power level of approximately 90 W, for example, up to 97 W. The pump diode may be coupled to the gain fiber 202 with a pump combiner 206. The emission wavelength output from the gain fiber 202 is tunable based on the TDFA drive current. Increasing the current of the pump diode 204 increases the output power of the amplifier 116 and simultaneously shifts the emission spectrum to longer wavelengths.

Figure 5A:
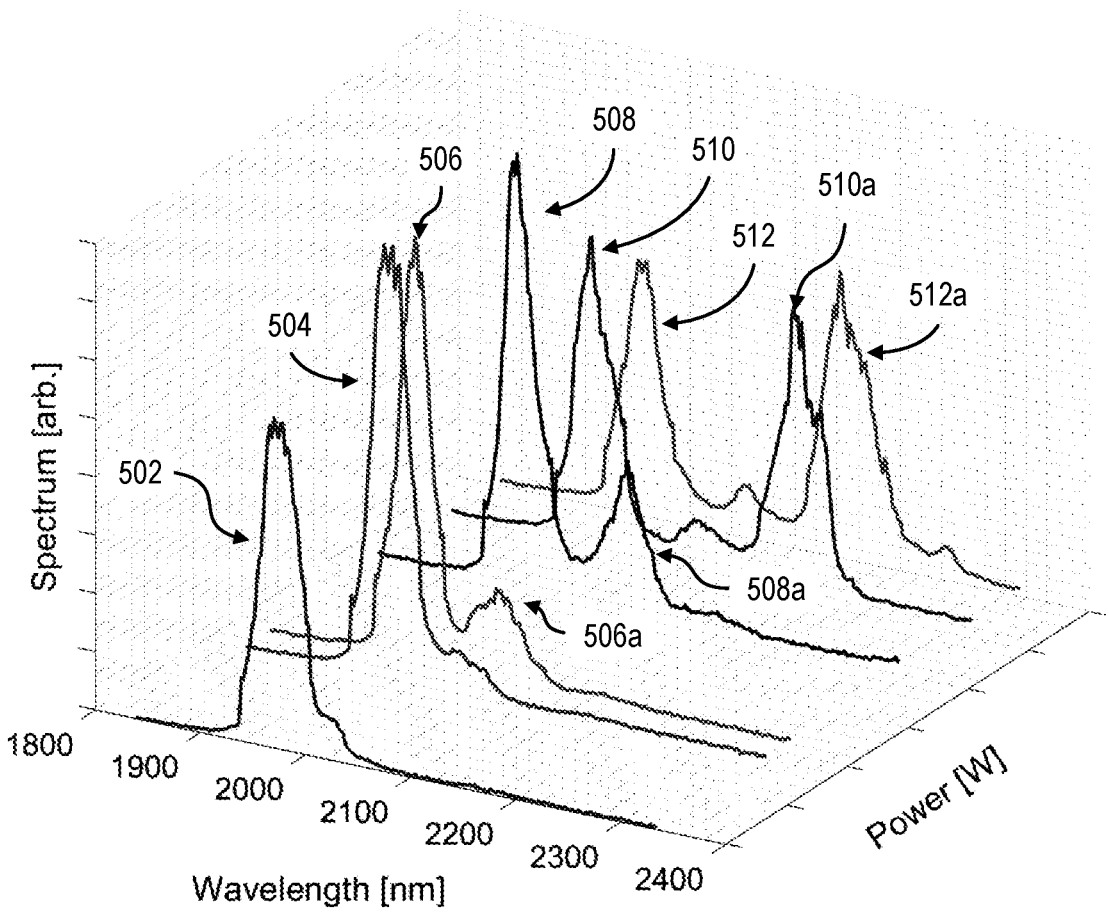
FIG. 5A is a graph illustrating a selection of example spectra that may be produced in the system of FIG. 1 or 2 based on soliton self-frequency shift according to aspects of the present disclosure.

FIG. 5A is a graph illustrating examples of emission spectra output from the TDFA 116 at different power levels, where the power level is controlled by controlling the pump diode current. In FIG. 5A, power spectral density is represented in arbitrary units as a function of wavelength (in nm) and amplifier power (in W). Trace 502 illustrates a baseline spectrum with the amplifier power level below the threshold at which soliton fission occurs. As the power level of the amplifier 116 is increased past the threshold level, soliton fission occurs, as illustrated by traces 504 and 506, with trace 506 showing a clearly defined soliton pulse 506*a*. Traces 508, 510, and 512 illustrate the output spectra, generated by soliton self-frequency shift, at higher amplifier power levels. As shown, as the power level of the amplifier 116 is further increased, the power spectral density in the solitons 508*a*, 510*a*, and 512*a* increases, and the central wavelength of the soliton is red-shifted (towards longer wavelengths) by the phenomenon of soliton self-frequency shift.

Figure 5B:
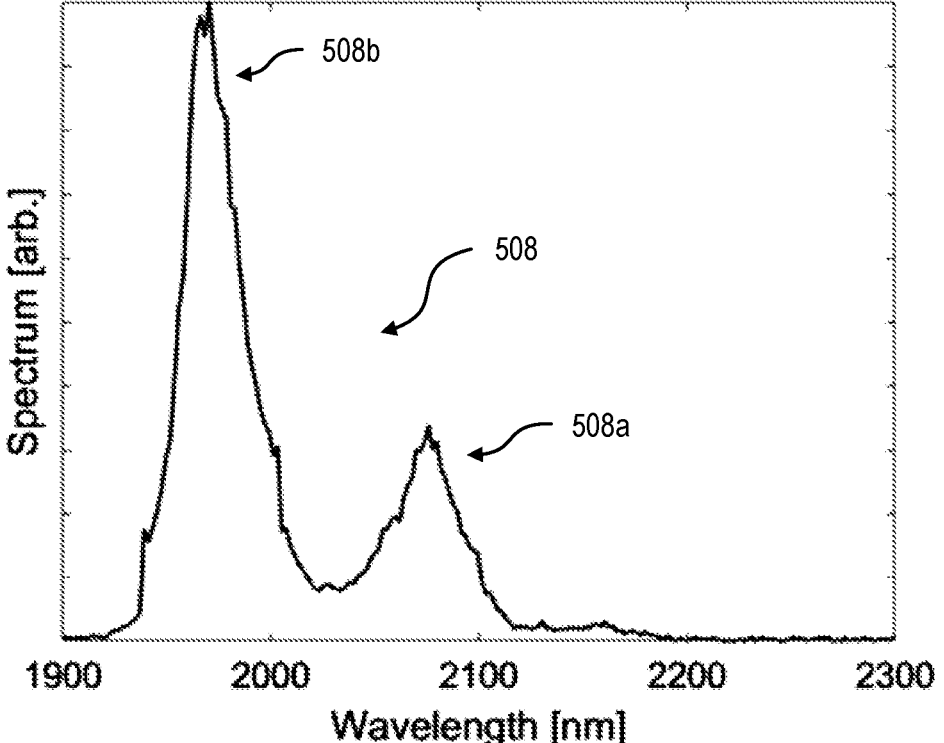
FIG. 5B is a graph showing an example of an output spectrum from a first channel of an example of the system of FIG. 1 or 2, in accord with aspects of the present disclosure.

FIG. 5B shows an example of a spectrum 508 corresponding to the output laser beam at the first output port 110 of the system 100. In FIG. 5B, the power spectral density is represented in arbitrary units on the vertical axis, and wavelength is represented in nm on the horizontal axis. In this example, the pulse emitted from the source 102 has a central wavelength of 1980 nm, as shown by peak 508*b* in the spectrum 508. The soliton 508*a* is centered around 2080 nm in this example. This spectrum 508 may be ideally suited to seed 2 μm amplifiers since it overlaps with the emissions cross-sections of gain medium such as Th:YLF, Ho:YLF, and Ho:YAG, all of which can be used as the pump source for 2 μm pumped OPCPA systems. However, in other examples for other applications, an output spectrum with a different soliton central wavelength can be produced.

According to certain examples, the wavelength of the soliton, and thus of the output laser beam produced at the first output port 110, is continuously tunable over a certain spectral range by adjusting the current of the pump diode 204. Thus, from the first channel 106, the system 100 may provide a highly configurable output beam that can be tailored in wavelength to suit a wide variety of different applications. According to certain examples, due to the transparency of fused silica fibers being limited to wavelengths below 2.4 μm, the soliton wavelength cannot be shifted past the SWIR spectral band in a fused silica fiber. Accordingly, embodiments of the system 100 include a mid-infrared fiber 120, such as a fluoride fiber, in the second channel 108 to allow for soliton shifting into the MWIR spectral band, as described further below. Thus, based on a ~2 μm source beam from the source 102, the first channel 106 may provide a first output beam at the first output port 110 that is a continuously tunable from ~2 μm to ~2.4 μm, in some examples, from 2 μm to 2.3 μm. As discussed above, in other examples, the amplifiers 116 can be implemented as erbium-doped fiber amplifiers, which lase at 1.5 μm rather than 2 μm. In such examples, the first channel 106 may provide a first output beam at the first output port 110 that is a continuously tunable from ~1.5 μm to ~2.4 μm. The second channel 108 is then used to provide a second output beam at the second output port 112 with a tunable wavelength into the MWIR spectral band.

Referring again to FIGS. 1 and 2, the second channel 108 is, in part, a duplicate of the first channel 106 and uses chirped pulse amplification to generate a red-shifted soliton based on the source beam as described above. The second channel additionally includes a length of mid-infrared fiber 120 which is transparent in the MWIR spectral band, and has anomalous chromatic dispersion, thus allowing for further soliton self-frequency shifting of the output beam wavelength to longer wavelengths. Fibers made from fluoride glass, chalcogenide glass, germinate glass, polycrystalline, and sapphire are transparent throughout various regions of the mid-infrared. For example, a zirconium-doped fluoride (ZrF4) fiber is transparent for wavelengths up to about 4 μm, and an indium-doped fluoride (InF3) fiber is transparent for wavelengths up to about 5 μm. Both of these fibers have anomalous chromatic dispersion in the mid-infrared, thus supporting optical solitons. Accordingly, the mid-infrared fiber 120 may include lengths of either ZrF4 or InF3 fiber, or any other fiber which is transparent in the mid-infrared and has anomalous chromatic dispersion. In one example, a 2 m length of InF3 fiber is used to further soliton shift the wavelength of the pulse output from the amplifier 116 from 2090 nm to 3800 nm. Thus, in this example, the gain fiber 202 in the second channel 108 is configured to produce a laser pulse having a wavelength centered at 2.09 μm (using chirped pulse amplification and soliton self-frequency shift in a fused silica fiber, as discussed above), and the second channel output beam provided at the second output port 112 has a wavelength centered at 3.8 μm generated via soliton self-frequency shift in the fluoride fiber 120.

Figure 6A:
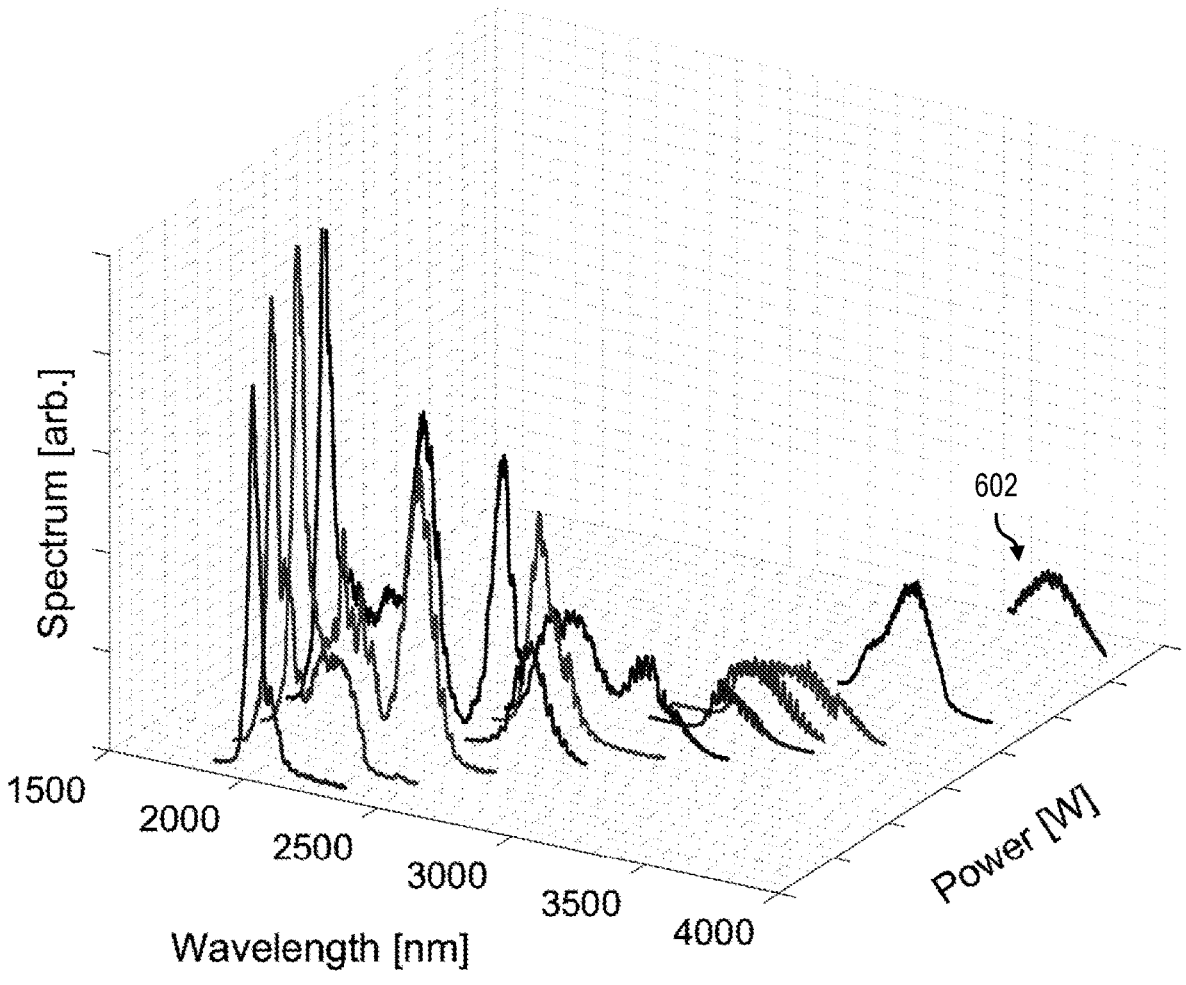
FIG. 6A is a graph illustrating a selection of example spectra that may be produced in the system of FIG. 1 or 2 based on soliton self-frequency shift in a fluoride fiber according to aspects of the present disclosure.

In certain examples, the wavelength of the second output beam provided at the second output port 112 can be controlled by controlling the power of the beam coupled into the fluoride fiber 120 from the gain fiber 202. FIG. 6A is a graph illustrating examples of emission spectra corresponding to the output beam provided at the second output port 112. In FIG. 6A, power spectral density is represented in arbitrary units as a function of wavelength (in nm) and total power (in W) output from the fluoride fiber 120. As shown, as the power level increases, soliton self-frequency shift causes the central wavelength of the soliton pulse to shift to longer wavelengths, similar to as described above with reference to FIG. 5A. The spectra shown in FIG. 6A were calibrated relative to one another by measuring the power transmitted through various optical filters It is noted that in FIG. 6A, trace 602, representing the most red-shifted spectrum, is illustrated at 10× amplitude relative to the other spectra shown in FIG. 5A.

Figure 6B:
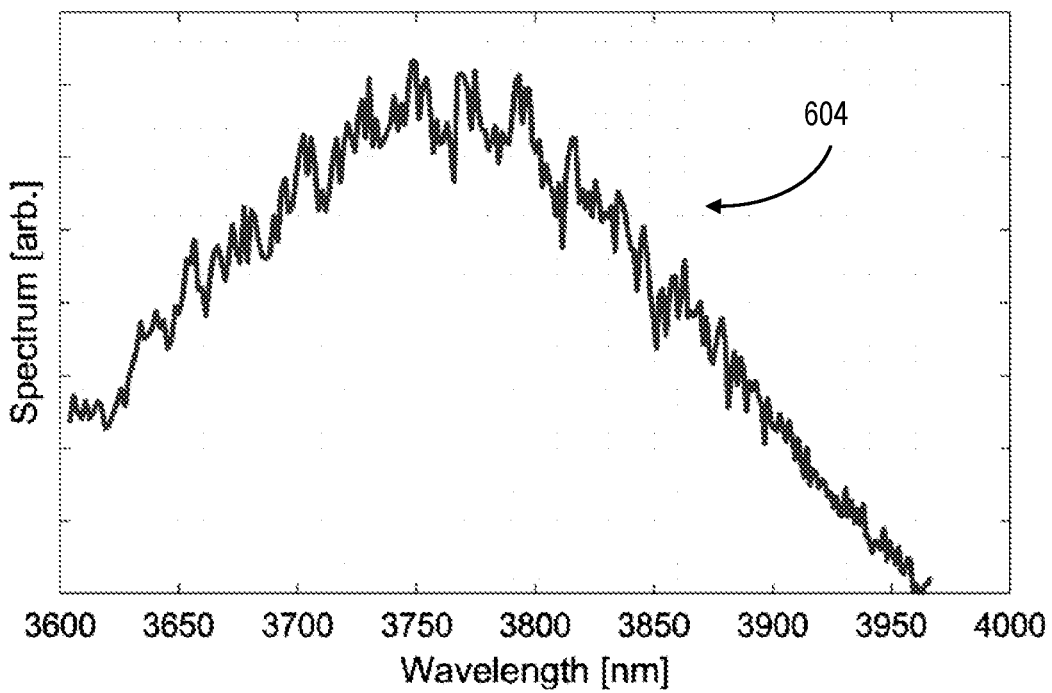
FIG. 6B is a graph showing an example of an output spectrum from a second channel of an example of the system of FIG. 1 or 2, in accord with aspects of the present disclosure.

FIG. 6B shows an example of a spectrum 604 corresponding to the output laser beam at the second output port 112 of the system 100. In FIG. 6B, the power spectral density is represented in arbitrary units on the vertical axis, and wavelength is represented in nm on the horizontal axis. The example spectrum 604 was obtained from launching a beam centered at 2090 nm with 6.1 W (122 nJ) of optical power into a 2 m length of InF3 fiber. As shown, the soliton-shifted pulse is centered around 3800 nm, thus demonstrating that soliton self-frequency shift in a fluoride fiber can be used to produce an output beam with a wavelength in the MWIR spectral band up to the degeneracy wavelength of band 1 (i.e. 2× band 1, which is approximately 4000 nm). The spectral bandwidth of the spectrum 604 supports an ultra-short pulse (e.g., ≤100 fs pulse duration).

Figure 6C:
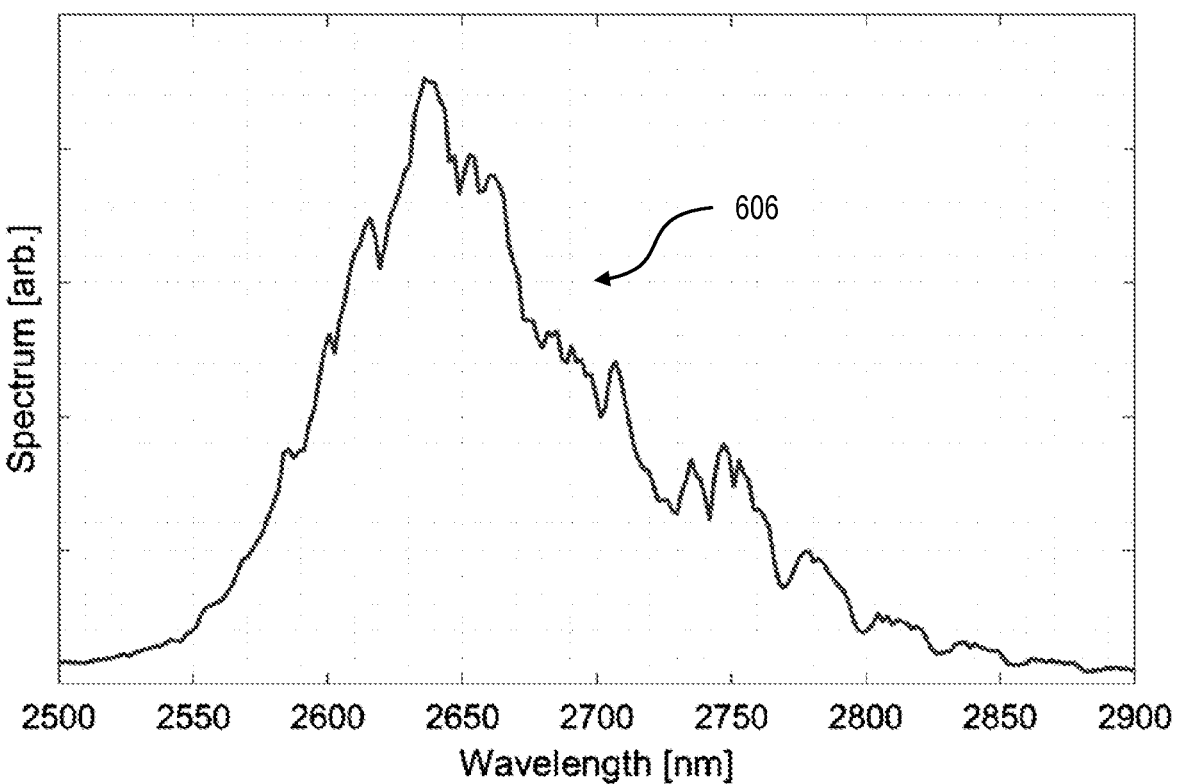
FIG. 6C is a graph showing another example of an output spectrum from a first channel of an example of the system of FIG. 1 or 2, in accord with aspects of the present disclosure.

FIG. 6C illustrates another example of a spectrum 606 corresponding to the output laser beam at the second output port 112 of the system 100. In FIG. 6C, the power spectral density is represented in arbitrary units on the vertical axis, and wavelength is represented in nm on the horizontal axis. In this example, the soliton pulse is centered at around 2650 nm. Various other example spectrums may be produced by controlling parameters of the second channel 108 in accord with the techniques disclosed herein.

As noted above, by controlling the power of the beam coupled into the mid-infrared fiber 120, the red-shift of the soliton can be controlled, and thus, the wavelength of the output beam produced at the second output port 112 can be tuned. In some examples, the power of the input beam to the mid-infrared fiber 120 can be adjusted as part of the coupling method used to couple the gain fiber 202 to the mid-infrared fiber 120. In some examples, the beam output from the gain fiber 202 can be coupled into the mid-infrared fiber 120 using free space optics or fiber fusion splicing. In one example, the fused silica fiber of the gain fiber 202 can be fusion spliced to the mid-infrared fiber 120 using any of various splicing techniques. One or more passive fiber lengths and/or mode field adapters may be positioned between the gain fiber 202 and the mid-infrared fiber 120 in some examples. In another example, free space coupling directly into the mid-infrared fiber 120 can be used. In another example, free space coupling using an off-axis parabolic lens into a mid-infrared fiber connector spliced to the mid-infrared fiber 120 can be used. Various other coupling techniques and implementations will be apparent given the benefit of this disclosure. Advantages of using fiber splicing include providing an all-fiber architecture that is mechanically stable, stable with respect to vibrations and/or temperature changes, and easy to transport.

In addition, the pulse center wavelength of the spectrum output from the mid-infrared fiber 120 may depend on the pulse center wavelength of the beam input to the mid-infrared fiber 120 from the gain fiber 202. As discussed above, the output wavelength from the gain fiber 202 can be continuously tuned over a spectral range, such as the range from 2 μm to ~2.4 μm, for example. As a result, the output wavelength from the mid-infrared fiber 120 can be continuously tuned by tuning the output power and wavelength from the thulium-doped fiber amplifier 202 by controlling the current in the pump diode 204, as discussed above. In certain examples, the wavelength of the second output beam at the second output port 112 can be continuously tuned over a spectral range from 2 μm to 3.9 μm, based on a 1.98 μm pulse from the source 102.

Figure 7:
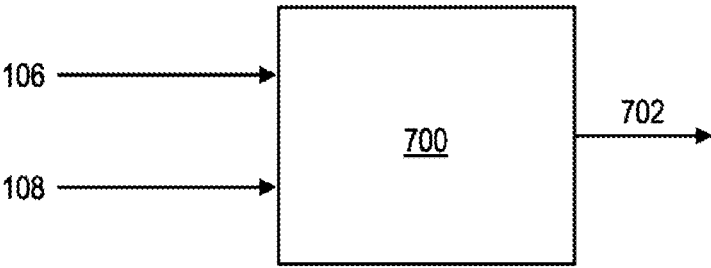
FIG. 7 is a block diagram showing an example of mixing first and second channel outputs from the system of FIG. 1 or 2 in a nonlinear crystal, in accord with aspects of the present disclosure.

Thus, embodiments of the system 100 can generate two output beams with emission wavelengths that are continuously tunable over two spectral ranges. As discussed above, in one example, the first channel 106 can produce, at the first output port 110, emission wavelengths spanning the range from ~2 μm to 2.3 μm, while the second channel 108 can produce, at the second output port 112, emission wavelengths spanning the range from ~2 μm to 3.9 μm. The two output beams are synchronized because they originate from the common source 102, and thus the system 100 avoids the need for electronic synching between two different lasers. This makes extension further into the mid infrared region and to long-wave infrared (e.g., 8-12 μm) achievable by mixing the output beams from the first and second channels 106, 108 in a $\chi^2$ nonlinear crystal 700, as shown in FIG. 7. In crystals with $\chi^2$ nonlinearity, optical paramedic amplification via difference frequency generation permits photons of higher frequencies, $\omega_p$, to amplify photons of a middle frequency, $\omega_s$, while also generating photons of low frequencies, $\omega_i$, in order to satisfy the energy conservation relationship $\hbar\omega_p = \hbar\omega_s + \hbar\omega_i$. For example, the spectrum 508 shown in FIG. 5B (an example of the output beam from the first channel 106) can be mixed with the spectrum 606 shown in FIG. 6C (an example of the output beam from the second channel 108) in a $\chi^2$ nonlinear crystal 700 to generate a resulting idler wavelength 702 that is centered around 10 μm in the long-wave infrared. Because the central wavelengths of the first channel 106 and the second channel 108 are tunable, the long-wave infrared emission central wavelength is also tunable. Emission wavelengths beyond 12 μm can also be achieved through appropriate tuning of the wavelengths of the beams output from the first and second channels 106, 108, and selection of the appropriate nonlinear crystal.

Thus, aspects and embodiments provide an ultrashort pulsed laser system with two continuously tunable output bands generated from a signal common source laser. Examples of the system employ TDFAs in each band to implement chirped pulse amplification. Gain media such as Cr:ZnS and Cr:ZnSe allow for direct lasing in the 2 μm region with wide bandwidths due to relatively flat and broad emission spectra produced by these materials. Additionally, nonlinear methods can be used, such as soliton-self-fre-quency-shifting as discussed above, to generate pulses in the MWIR portion of the spectrum. Extension into the LWIR spectral region can be achieved using optical parametric amplification via difference frequency generation, as described above. Thus, an ultrashort pulsed laser with con-tinuously tunable wavelength spanning several spectral ranges is provided, which can form the basis for USPL systems configured for a wide variety of applications

FURTHER EXAMPLE EMBODIMENTS

The following examples pertain to further embodiments, from which numerous permutations and configurations will be apparent.

Example 1 provides a pulsed laser system comprising a first output port, a second output port, a source laser con-figured to emit a source laser beam comprising a series of pulses, a splitter optically coupled to the source laser and configured to split the source laser beam into first and second optical paths to provide first and second input laser beams, a first amplifier module configured to amplify the first input laser beam using chirped pulse amplification and to produce a first output laser beam in a first spectral range at the first output port based on soliton self-frequency shift in the first amplifier module, a second amplifier module configured to amplify the second input laser beam using chirped pulse amplification and produce an intermediate beam based on soliton self-frequency shift in the second amplifier module, and a mid-infrared fiber coupled between the second ampli-fier and the second output port, wherein the mid-infrared fiber is configured to receive the intermediate beam and to produce a second output laser beam in a second spectral range at the second output port based on soliton self-frequency shift in the mid-infrared fiber. The mid-infrared fiber may be any type of glass fiber that is transparent in the mid-infrared and has anomalous chromatic dispersion within the mid-infrared spectral range.

Example 2 includes the pulsed laser system of Example 1, wherein the first amplifier module comprises a first thulium-doped fiber amplifier, and wherein a wavelength of the first output laser beam is continuously tunable within the first spectral range based on controlling a pump current supplied to the first thulium-doped fiber amplifier.

Example 3 includes the pulsed laser system of Example 2, wherein the second amplifier module comprises a second thulium-doped fiber amplifier, and wherein a wavelength of the intermediate beam is continuously tunable within the first spectral range based on controlling a pump current supplied to the second thulium-doped fiber amplifier.

Example 4 includes the pulsed laser system of Example 3, wherein each of the first and second thulium-doped fiber amplifiers comprises a fused silica optical fiber, and wherein the wavelengths of the first output laser beam and the intermediate beam are produced by soliton self-frequency shift in the fused silica fibers.

Example 5 includes the pulsed laser system of one of Examples 3 and 4, wherein the first amplifier module further comprises a first pulse stretcher coupled between the splitter and the first thulium doped-fiber amplifier, and a first pulse compressor coupled between the first thulium-doped fiber amplifier and the first output port.

Example 6 includes the pulsed laser system of Example 5, wherein the second amplifier module further comprises a second pulse stretcher coupled between the splitter and the second thulium-doped fiber amplifier, and a second pulse compressor coupled between the second thulium-doped fiber amplifier and the fluoride fiber.

Example 7 includes the pulsed laser system of Example 6, wherein each of the first and second pulse stretchers com-prises a polarization-maintaining, normally dispersive opti-cal fiber, and wherein each of the first and second pulse compressors comprises a large mode-area, polarization-maintaining, anomalous dispersion optical fiber.

Example 8 includes the pulsed laser system of any one of Examples 1-7, wherein the first spectral range includes a wavelength range from 2 micrometers to 2.3 micrometers.

Example 9 includes the pulsed laser system of any one of Examples 1-8, wherein the second spectral range includes a wavelength range from 2 micrometers to 3.9 micrometers.

Example 10 includes the pulsed laser system of any one of Examples 1-9, further comprising a nonlinear crystal configured to receive and mix the first and second output laser beams to produce a third output laser beam having a wavelength in a third spectral range.

Example 11 includes the pulsed laser system of Example 10, wherein the first spectral range includes at least a portion of the short-wave infrared spectrum, the second spectral range includes at least a portion of the mid-wave infrared spectrum, and the third spectral range includes at least a portion of the long-wave infrared spectrum.

Example 12 includes the pulsed laser system of any of Examples 1-11, wherein the source laser beam has a wave-length of approximately 1.5 to 2.0 μm.

Example 13 provides an ultrashort pulsed laser system comprising a source laser configured to emit a source laser pulse having a source central wavelength, a splitter optically coupled to the source laser via at least one passive polar-ization-maintaining optical fiber and configured to split the source laser pulse into first and second optical paths, a first thulium-doped fiber amplifier (TDFA) positioned in the first optical path and configured to amplify the source laser pulse, the first TDFA being pumped with a first pump current sufficient to produce soliton fission in the first TDFA to generate a first output laser pulse having a first central wavelength that is red-shifted relative to the source central wavelength based on soliton self-frequency shift, the first central wavelength being in a first spectral range, a second TDFA positioned in the second optical path and configured to amplify the source laser pulse, the second TDFA being pumped with a second pump current sufficient to produce soliton fission in the second TDFA to generate an interme-diate laser pulse having a central wavelength that is in the first spectral range and red-shifted relative to the source central wavelength based on soliton self-frequency shift, and a fluoride fiber coupled to the second TDFA and configured to red-shift the central wavelength of the intermediate laser pulse to produce a second output laser pulse having a second central wavelength in a second spectral range.

Example 14 includes the ultrashort pulsed laser system of Example 13, wherein each of the first and second TDFAs includes a fused silica fiber, and wherein the soliton self-frequency shift occurs in the fused silica fiber.

Example 15 includes the ultrashort pulsed laser system of one of Examples 13 and 14, wherein the mid-infrared fiber causes the red-shift of the central wavelength of the intermediate laser pulse based on soliton self-frequency shift in the mid-infrared fiber.

Example 16 includes the ultrashort pulsed laser system of any one of Examples 13-15, wherein the first spectral range includes at least a portion of the short-wave infrared spectrum, and wherein the second spectral range includes at least a portion of the mid-wave infrared spectrum.

Example 17 includes the ultrashort pulsed laser system of any one of Examples 13-16, further comprising a nonlinear crystal configured to receive and mix the first and second output laser pulses to produce a third output laser pulse having a third central wavelength in a third spectral range spanning at least a portion of the long-wave infrared spectrum.

Example 18 includes the ultrashort pulsed laser system of any one of Examples 13-17, wherein the source central wavelength is in a range of 1.5 μm to 2 μm.

Example 19 includes the ultrashort pulsed laser system of any one of Examples 13-18, further comprising first and second pulse stretchers positioned in the first and second optical paths, respectively, and configured to temporally stretch the source laser pulse prior to amplification of the source laser pulse by the first and second TDFAs, respectively, and first and second pulse compressors positioned in the first and second optical paths, respectively, and configured to temporally compress the first output laser pulse and the intermediate laser pulse, respectively.

Example 20 includes the ultrashort pulsed laser system of Example 19, wherein the first and second pulse stretchers individually include a polarization-maintaining, normally dispersive optical fiber, and wherein the first and second pulse compressors individually include a large mode-area, polarization-maintaining, anomalous dispersion optical fiber.

Example 21 provides a dual-band ultrashort pulsed laser system comprising a source laser configured to emit a source laser beam comprising a series of ultrashort pulses having a source wavelength, a 50/50 splitter configured to split the source laser beam into first and second channels, a first module in the first channel and configured to produce, from the source laser beam and using soliton self-frequency shift in a first gain fiber, a first pulsed output laser beam comprising a series of ultrashort pulses having a first output wavelength that is continuously tunable within a first spectral range, the first spectral range being red-shifted relative to the source wavelength and including at least a portion of the short-wave infrared spectrum, and a second module in the second channel and configured to produce, from the source laser beam and using soliton self-frequency shift in a second gain fiber and in mid-infrared fiber coupled to the second gain fiber, a second pulsed output laser beam comprising a series of ultrashort pulses having a second output wavelength that is continuously tunable within a second spectral range, the second spectral range being red-shifted relative to the source wavelength and including at least a portion of the mid-wave infrared spectrum.

Example 22 includes the dual-band ultrashort pulsed laser system of Example 21, wherein the first and second gain fibers each include a thulium-doped fiber amplifier.

Example 23 includes the dual-band ultrashort pulsed laser system of Example 22, further comprising pump diodes coupled to the respective thulium-doped fiber amplifiers, wherein the soliton self-frequency shift in the first and second gain fibers is controlled by controlling a current in the pump diodes.

Example 24 includes the dual-band ultrashort pulsed laser system of one of Examples 22 and 23, wherein the first module comprises a first pulse stretcher and a first pulse compressor, the thulium-doped fiber amplifier being coupled between the first pulse stretcher and the first pulse compressor.

Example 25 includes the dual-band ultrashort pulsed laser system of Example 24, wherein the second module comprises a second pulse stretcher and a second pulse compressor, the thulium-doped fiber amplifier being coupled between the second pulse stretcher and the second pulse compressor.

Example 26 includes the dual-band ultrashort pulsed laser system of Example 25, wherein the first and second pulse compressors individually include a polarization-maintaining, normally dispersive optical fiber, and wherein the first and second pulse compressors individually include a large mode-area, polarization-maintaining, anomalous dispersion optical fiber.

Example 27 includes the dual-band ultrashort pulsed laser system of any one of Examples 21-26, wherein the first and second gain fibers include fused silica fibers.

Example 28 includes the dual-band ultrashort pulsed laser system of any one of Examples 21-23, further comprising a pulse stretcher coupled between the source laser and the 50/50 splitter and configured to temporally stretch pulses of the series of ultrashort pulses emitted by the source laser.

Example 29 includes the dual-band ultrashort pulsed laser system of Example 28, wherein the pulse stretcher includes a polarization-maintaining, normally dispersive optical fiber.

Example 30 includes the dual-band ultrashort pulsed laser system of Example 29, wherein each of the first and second gain fibers includes a pulse compressor, and wherein the pulse compressor includes a large mode-area, polarization-maintaining, anomalous dispersion optical fiber.

Example 31 includes the dual-band ultrashort pulsed laser system of any one of Examples 21-30, wherein the source wavelength is approximately 2.0 μm or in a range of 1.5 μm to 2 μm.

Example 32 includes the dual-band ultrashort pulsed laser system of any one of Examples 21-31, wherein the first spectral range includes a wavelength range from 2 μm to 2.3 μm.

Example 33 includes the dual-band ultrashort pulsed laser system of any one of Examples 21-32, wherein the second spectral range includes a wavelength range from 2 μm to 3.9 μm.

Example 34 includes the dual-band ultrashort pulsed laser system of any one of Examples 21-33, further comprising a nonlinear crystal configured to receive and mix the first and second pulsed output laser beams to produce a third pulsed output laser beam having a wavelength in a third spectral range.

Example 35 includes the dual-band ultrashort pulsed laser system of Example 34, wherein the third spectral range includes a wavelength range from 4 μm to 12 μm.

Example 36 includes the dual-band ultrashort pulsed laser system of any one of Examples 21-35, wherein pulses of the series of ultrashort pulses of the source laser beam have a pulse duration of approximately 100 fs.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A pulsed laser system comprising:
a first output port;
a second output port;
a source laser configured to emit a source laser beam comprising a series of pulses;
a splitter optically coupled to the source laser and configured to split the source laser beam into first and second optical paths to provide first and second input laser beams;
a first amplifier module configured to amplify the first input laser beam using chirped pulse amplification and to produce a first output laser beam in a first spectral range at the first output port based on soliton self-frequency shift in the first amplifier module;
a second amplifier module configured to amplify the second input laser beam using chirped pulse amplification and to produce an intermediate beam based on soliton self-frequency shift in the second amplifier module; and
a mid-infrared fiber coupled between the second amplifier and the second output port, wherein the mid-infrared fiber is configured to receive the intermediate beam and to produce a second output laser beam in a second spectral range at the second output port based on soliton self-frequency shift.

2. The pulsed laser system of claim 1, wherein the first amplifier module comprises a first thulium-doped fiber amplifier; and
wherein a wavelength of the first output laser beam is continuously tunable within the first spectral range based on controlling a pump current supplied to the first thulium-doped fiber amplifier.

3. The pulsed laser system of claim 2, wherein the second amplifier module comprises a second thulium-doped fiber amplifier; and
wherein a wavelength of the intermediate beam is continuously tunable within the first spectral range based on controlling a pump current supplied to the second thulium-doped fiber amplifier.

4. The pulsed laser system of claim 3, wherein the first amplifier module further comprises:
a first pulse stretcher coupled between the splitter and the first thulium-doped fiber amplifier; and
a first pulse compressor coupled between the first thulium-doped fiber amplifier and the first output port.

5. The pulsed laser system of claim 4, wherein the second amplifier module further comprises:
a second pulse stretcher coupled between the splitter and the second thulium-doped fiber amplifier; and a second pulse compressor coupled between the second thulium-doped fiber amplifier and the mid-infrared fiber.

6. The pulsed laser system of claim 5, wherein each of the first and second pulse stretchers comprises a polarization-maintaining, normally dispersive optical fiber; and
wherein each of the first and second pulse compressors comprises a large mode-area, polarization-maintaining, anomalous dispersion optical fiber.

7. The pulsed laser system of claim 3, wherein each of the first and second thulium-doped fiber amplifiers comprises a fused silica optical fiber, and wherein the wavelengths of the first output laser beam and the intermediate beam are produced by soliton self-frequency shift in the fused silica fibers.

8. The pulsed laser system of claim 1, wherein the first spectral range includes a wavelength range from 2 micrometers to 2.3 micrometers.

9. The pulsed laser system of claim 1, wherein the second spectral range includes a wavelength range from 2 micrometers to 3.9 micrometers.

10. The pulsed laser system of claim 1, further comprising a nonlinear crystal configured to receive and mix the first and second output laser beams to produce a third output laser beam having a wavelength in a third spectral range.

11. The pulsed laser system of claim 10, wherein the first spectral range includes at least a portion of the short-wave infrared spectrum, the second spectral range includes at least a portion of the mid-wave infrared spectrum, and the third spectral range includes at least a portion of the long-wave infrared spectrum.

12. An ultrashort pulsed laser system comprising:
a source laser configured to emit a source laser pulse having a source central wavelength;
a splitter optically coupled to the source laser via at least one passive polarization-maintaining optical fiber and configured to split the source laser pulse into first and second optical paths;
a first thulium-doped fiber amplifier (TDFA) positioned in the first optical path and configured to amplify the source laser pulse, the first TDFA being pumped with a first pump current sufficient to produce soliton fission in the first TDFA to generate a first output laser pulse having a first central wavelength that is red-shifted relative to the source central wavelength based on soliton self-frequency shift, the first central wavelength being in a first spectral range;
a second TDFA positioned in the second optical path and configured to amplify the source laser pulse, the second TDFA being pumped with a second pump current sufficient to produce soliton fission in the second TDFA to generate an intermediate laser pulse having a central wavelength that is in the first spectral range and red-shifted relative to the source central wavelength based on soliton self-frequency shift; and
a mid-infrared fiber coupled to the second TDFA and configured to red-shift the central wavelength of the intermediate laser pulse to produce a second output laser pulse having a second central wavelength in a second spectral range.

13. The ultrashort pulsed laser system of claim 12, wherein each of the first and second TDFAs includes a fused silica fiber, and wherein the soliton self-frequency shift occurs in the fused silica fiber.

14. The ultrashort pulsed laser system of claim 12, wherein the mid-infrared fiber causes the red-shift of the central wavelength of the intermediate laser pulse based on soliton self-frequency shift in the mid-infrared fiber.

15. The ultrashort pulsed laser system of claim 12, wherein the first spectral range includes at least a portion of the short-wave infrared spectrum, and wherein the second spectral range includes at least a portion of the mid-wave infrared spectrum.

16. The ultrashort pulsed laser system of claim 15, further comprising a nonlinear crystal configured to receive and mix the first and second output laser pulses to produce a third output laser pulse having a third central wavelength in a third spectral range spanning at least a portion of the long-wave infrared spectrum.

17. The ultrashort pulsed laser system of claim 12, wherein the source central wavelength is in a range of 1.5 μm to 2 μm.

18. The ultrashort pulsed laser system of claim 12, further comprising:

first and second pulse stretchers positioned in the first and second optical paths, respectively, and configured to temporally stretch the source laser pulse prior to amplification of the source laser pulse by the first and second TDFAs, respectively; and first and second pulse compressors positioned in the first and second optical paths, respectively, and configured to temporally compress the first output laser pulse and the intermediate laser pulse, respectively.

19. The ultrashort pulsed laser system of claim 18, wherein the first and second pulse stretchers individually include a polarization-maintaining, normally dispersive optical fiber; and wherein the first and second pulse compressors individually include a large mode-area, polarization-maintaining, anomalous dispersion optical fiber.

20. A dual-band ultrashort pulsed laser system comprising:

a source laser configured to emit a source laser beam comprising a series of ultrashort pulses having a source wavelength;

a 50/50 splitter configured to split the source laser beam into first and second channels;

a first module in the first channel and configured to produce, from the source laser beam and using soliton self-frequency shift in a first gain fiber, a first pulsed output laser beam comprising a series of ultrashort pulses having a first output wavelength that is continuously tunable within a first spectral range, the first spectral range being red-shifted relative to the source wavelength and including at least a portion of the short-wave infrared spectrum; and a second module in the second channel and configured to produce, from the source laser beam and using soliton self-frequency shift in a second gain fiber and in a mid-infrared fiber coupled to the second gain fiber, a second pulsed output laser beam comprising a series of ultrashort pulses having a second output wavelength that is continuously tunable within a second spectral range, the second spectral range being red-shifted relative to the source wavelength and including at least a portion of the mid-wave infrared spectrum.

* * * * *